Aug. 19, 1930.   I. SCHIGYO   1,773,633
ALTERNATING CURRENT COMMUTATOR MOTOR
Filed May 29, 1929
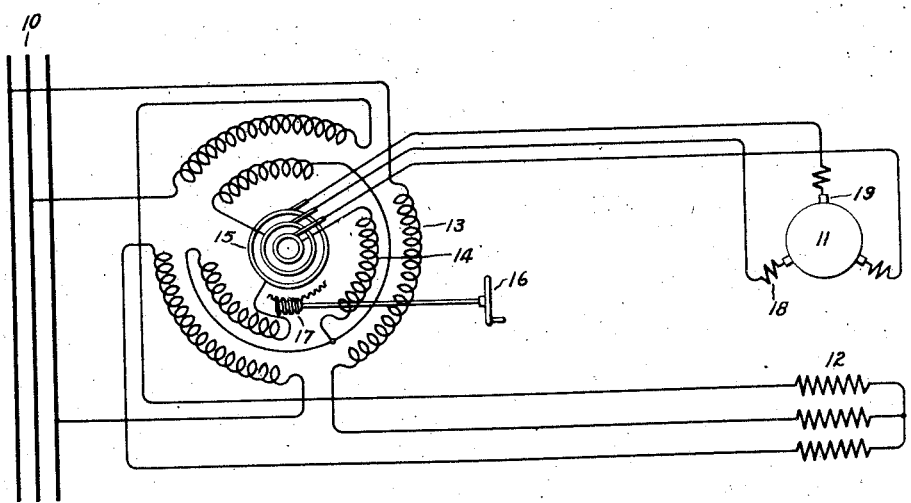
Inventor:
Iwane Schigyo,
by Charles E Mullen
His Attorney.

Patented Aug. 19, 1930

1,773,633

UNITED STATES PATENT OFFICE

IWANE SCHIGYO, OF YOKOHAMA, JAPAN, ASSIGNOR TO GENERAL ELECTRIC COMPANY, A CORPORATION OF NEW YORK

ALTERNATING-CURRENT COMMUTATOR MOTOR

Application filed May 29, 1929, Serial No. 367,062, and in Japan September 25, 1928.

My invention relates to alternating current commutator machines and in particular to series commutator motors and its object is to provide a method and means for regulating such machines without shifting the brushes.

Certain types of alternating current commutator motors are provided with brushes connected between the rotor and stator winding, either directly or through a transformer, and the brushes are made adjustable for the purpose of speed regulation. In large motors of this type it is desirable to provide commutating pole windings and in such cases it is of course undesirable to shift the brushes to any appreciable extent since they must remain under the commutating poles if the latter are to be effective in improving commutation.

In accordance with my invention I provide an adjustable phase shifting device between the commutator brushes and the stator winding with which the brushes are associated to vary the motor speed by shifting the phase relation of the currents between the stator winding and the brushes while the latter remain stationary. This phase shifting arrangement accomplishes the same regulating purpose as would be accomplished in the ordinary brush shifting motor by shifting the brushes. In this way the commutator motor may be provided with commutating pole field windings in fixed relation to the brushes, thus affording ideal commutating conditions and at the same time the motor may have its speed varied as in the brush shifting motor without resorting to any brush shifting arrangement whatever.

The invention is of particular advantage in the series type of commutator motor since in this type it is usually desirable to provide a series transformer between the stator winding and the commutator brushes to reduce the commutator voltage. In accordance with my invention this series transformer may be made and used as a series phase shifting transformer and thus accomplish the double purpose indicated above.

The features of my invention which are believed to be novel and patentable will be pointed out in the claims appended hereto.

For a better understanding of my invention reference is made, in the following description, to the accompanying drawing showing one embodiment of my invention as applied to the series commutator motor.

Referring to the drawing, 10 represents a suitable source of polyphase supply, 11 the rotor, and 12 the main stator winding of a polyphase commutator motor. Connected between the source 10 and the motor is a combined series transformer and phase shifter. The primary winding 13 of this device is connected in series relation between the line 10 and stator winding 12 of the motor. The winding 14 of the phase shifter is adjustable with respect to winding 13 in such a manner that the phase relation between the voltages impressed upon rotor and stator of the motor may be shifted through 180 electrical degrees more or less as desired. For this purpose the winding is rotatably mounted and connected to slip rings 15 and a suitable means such as the hand wheel 16 and gearing 17 are provided to rotate the secondary part of the device so as to shift the phase angle of the secondary voltage.

The motor may then be provided with commutating poles indicated at 18 and fixed brushes 19.

It will now be apparent that rotation of winding 14 with respect to winding 13 of the phase shifter will have the same effect upon the speed regulation as shifting the brushes 19 would have and in this way I obtain a wide range of speed regulation without a complicated brush shifting arrangement and obtain the benefit of a fixed relation between the commutating poles and brushes of the motor.

Since the phase shifter is a series transformer the secondary current is proportional to the primary current. The relative number of turns in windings 13 and 14 may be selected to reduce the brush voltage to any desired extent.

Having thus described the essential features of a preferred embodiment of my invention I intend to cover in the appended claims such modifications of the invention as fall within the true spirit and scope of my invention.

What I claim as new and desire to secure by Letters Patent of the United States is:

1. An alternating current dynamo electric machine provided with a commutated rotor winding, stationary brushes bearing on said commutator, commutating pole field windings, a stator winding for said machine, and a phase shifting transformer having a primary winding connected in series relation with said stator winding, and a secondary winding connected through said commutating pole winding to said brushes.

2. In combination, an alternating current motor provided with a commutated rotor winding and a sationary primary winding, commutating pole field windings connected to the rotor winding through a stationary set of commutator brushes, a source of supply, a transformer having primary windings connected between said source and said stator windings, and a secondary winding for said transformer connected to said commutating pole field windings, the windings of said transformer being relatively adjustable with respect to each other for the purpose of varying the phase angular relation of the voltages impressed upon said rotor and stator windings in order to vary the speed of the motor.

In witness whereof, I have hereunto set my hand this eighth day of May, 1929.

IWANE SCHIGYO.